United States Patent
Wittmaak, Jr. et al.

(10) Patent No.: US 11,975,817 B2
(45) Date of Patent: May 7, 2024

(54) TURN INTO WIND METHOD AND SYSTEM

(71) Applicant: Bell Textron Inc., Fort Worth, TX (US)

(72) Inventors: John R. Wittmaak, Jr., Newark, TX (US); Russell C. Peters, Fort Worth, TX (US); Nathaniel G. Lundie, Dallas, TX (US)

(73) Assignee: Textron Innovations Inc., Providence, RI (US)

( * ) Notice: Subject to any disclaimer, the term of this patent is extended or adjusted under 35 U.S.C. 154(b) by 464 days.

(21) Appl. No.: 17/175,327

(22) Filed: Feb. 12, 2021

(65) Prior Publication Data
US 2022/0258851 A1    Aug. 18, 2022

(51) Int. Cl.
| | |
|---|---|
| G05D 1/00 | (2006.01) |
| B64C 13/16 | (2006.01) |
| B64C 29/02 | (2006.01) |
| B64F 5/60 | (2017.01) |

(52) U.S. Cl.
CPC .............. B64C 13/16 (2013.01); B64C 29/02 (2013.01); B64F 5/60 (2017.01)

(58) Field of Classification Search
CPC ........... B64C 13/16; B64C 29/02; B64F 5/60; G05D 1/0816; G05D 1/00
USPC .......................................................... 701/4
See application file for complete search history.

(56) References Cited

U.S. PATENT DOCUMENTS

| | | | | |
|---|---|---|---|---|
| 3,930,610 | A * | 1/1976 | Hache | G06G 7/78 701/6 |
| 7,617,024 | B2 * | 11/2009 | Builta | G05D 1/0202 244/11 |
| 10,597,164 | B2 * | 3/2020 | Oldroyd | G05D 3/00 |
| 10,618,646 | B2 * | 4/2020 | McCullough | B64C 27/52 |
| 11,613,349 | B2 * | 3/2023 | North | B64C 29/0075 244/7 R |
| 2004/0026563 | A1 * | 2/2004 | Moller | B64D 27/06 244/12.4 |
| 2006/0229080 | A1 * | 10/2006 | Khan | H04W 48/18 455/433 |
| 2009/0045295 | A1 * | 2/2009 | Lundgren | B64C 29/0033 701/4 |
| 2011/0054721 | A1 * | 3/2011 | Goodrich | G05B 23/0283 701/14 |
| 2016/0117936 | A1 * | 4/2016 | Klinger | G08G 5/0021 701/3 |
| 2019/0061936 | A1 * | 2/2019 | North | B64C 11/46 |
| 2020/0097874 | A1 * | 3/2020 | Wannenmacher | G06Q 10/0633 |
| 2020/0231297 | A1 * | 7/2020 | Oldroyd | G05D 1/0072 |
| 2020/0334993 | A1 * | 10/2020 | Demri | G08G 5/0039 |

* cited by examiner

*Primary Examiner* — Shardul D Patel
(74) *Attorney, Agent, or Firm* — Frost Brown Todd LLP

(57) ABSTRACT

A method for reducing form drag on a tailsitter aircraft during at least one of takeoff or landing includes vertically taking off from the ground in a tailsitter orientation. The method also includes determining an actual pitch of the tail sitter aircraft in the tailsitter orientation. The method also includes determining a difference between the actual pitch and a predetermined pitch. The method also includes adjusting a heading of the tailsitter aircraft based on the difference to minimize a pitch angle to reduce the form drag on the tailsitter aircraft.

20 Claims, 5 Drawing Sheets

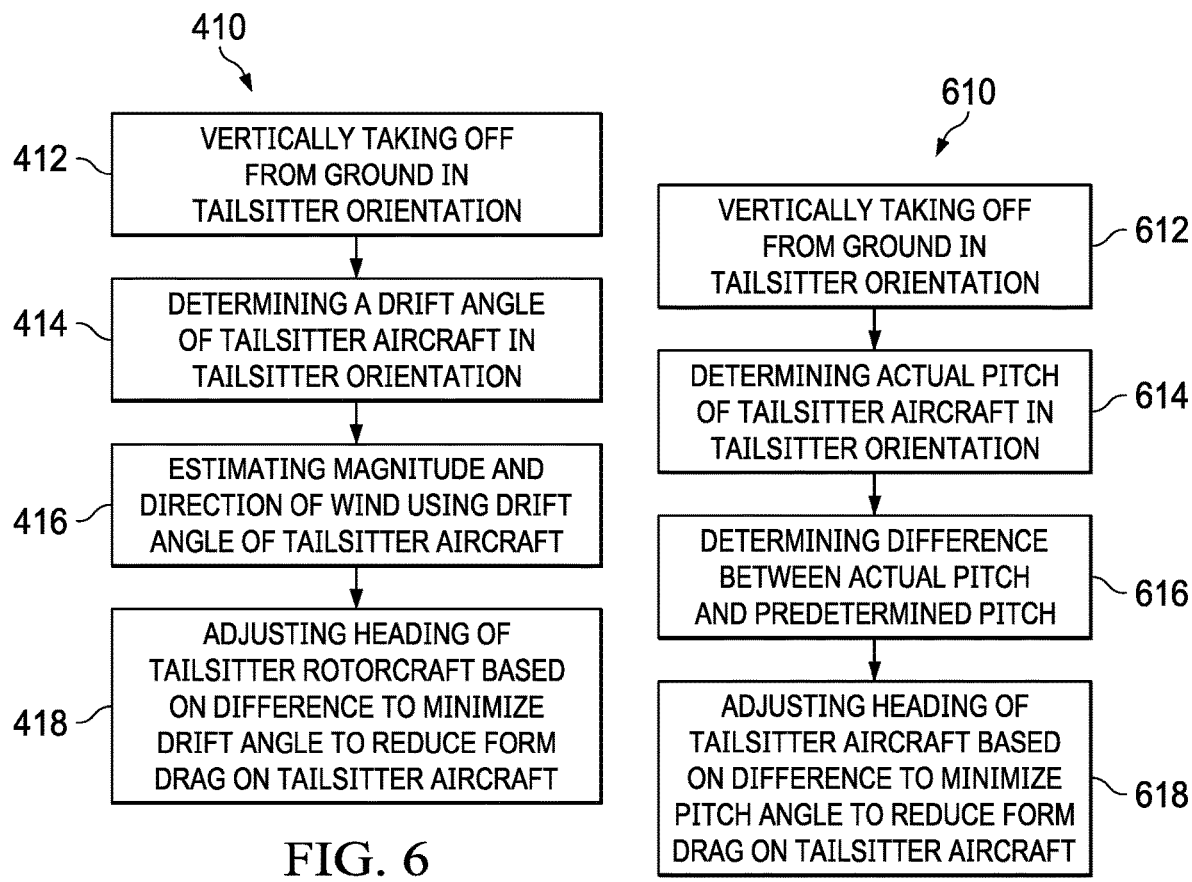
FIG. 6
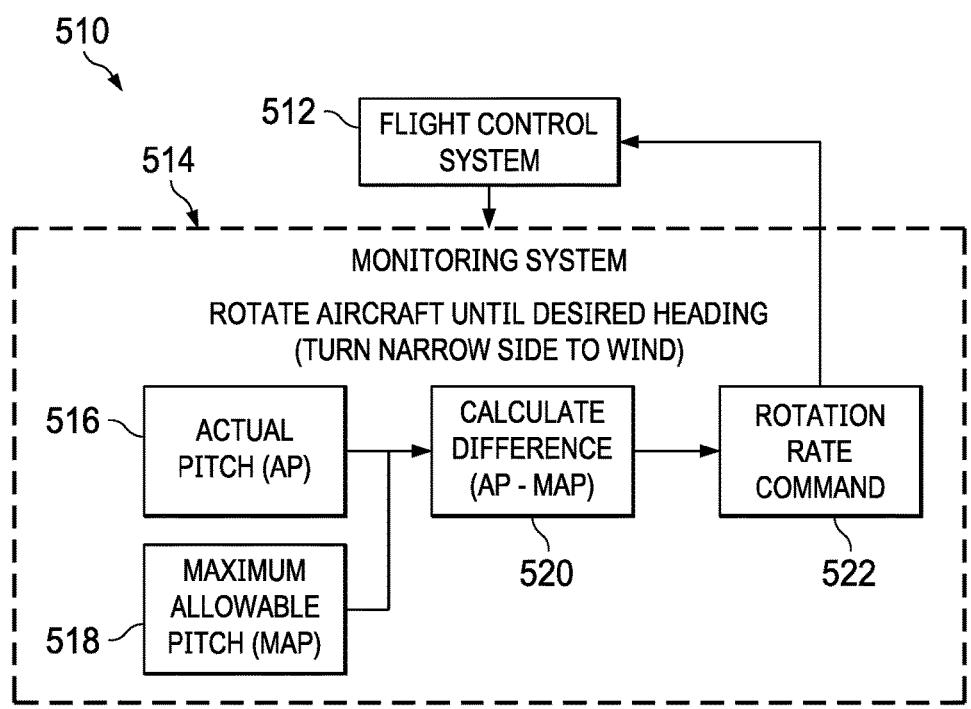
FIG. 8
FIG. 7

TURN INTO WIND METHOD AND SYSTEM

TECHNICAL FIELD

The present disclosure is directed to systems and methods for controlling the heading of an aircraft experiencing an excessive lateral force (e.g., a cross-wind). More particularly, embodiments of the present invention relate to methods and systems for turning an aircraft into the wind.

BACKGROUND OF THE INVENTION

Aircraft may be manned or unmanned. Manned aircraft are commanded by a pilot. Unmanned aircraft may be commanded by a ground control station (GCS) operator or flight control box (FCB) operator. Generally, an aircraft is either a fixed wing aircraft or a rotorcraft. One such example of a fixed wing aircraft is an airplane that includes horizontal wings, a fuselage, a vertical stabilizer, a horizontal stabilizer, and a landing gear. One such example of a rotorcraft is a vertical takeoff and landing (VTOL) aircraft.

VTOL aircraft may include, but are not limited to, tiltrotor aircraft, helicopters, or autogyros. VTOL aircraft may, for example, take off and land vertically, move horizontally, or hover in place. VTOL aircraft may move or maintain their position in response to external forces by pitching one or more main rotors. Unlike fixed-wing aircraft, (VTOL) aircraft do not require runways. Instead, VTOL aircraft are capable of taking off, hovering and landing vertically. One example of VTOL aircraft is a helicopter which has one or more rotors that provide lift and thrust to the aircraft. The rotors not only enable hovering and vertical takeoff and landing, but also enable, forward, backward and lateral flight. As a result, helicopters are versatile for use in congested, isolated, or remote areas where fixed-wing aircraft may be unable to take off and land. Rotorcraft, however, typically lack the forward airspeed of fixed-wing aircraft.

Some aircraft are inherently more stable or have improved performance when the aircraft is oriented a certain direction relative to the wind. Some aircraft land more stable when the aircraft is oriented a certain direction relative to the wind to reduce the likelihood or risk of a rollover. As a result, it may be beneficial to orient the aircraft to be more stable.

BRIEF SUMMARY OF THE INVENTION

One embodiment of the present disclosure comprises a method for reducing form drag on a tailsitter aircraft during at least one of takeoff or landing. The method includes vertically taking off from the ground in a tailsitter orientation. The method also includes determining an actual pitch of the tailsitter aircraft in the tailsitter orientation. The method also includes determining a difference between the actual pitch and a predetermined pitch. The method also includes adjusting a heading of the tailsitter aircraft based on the difference to minimize a pitch angle to reduce the form drag on the tailsitter aircraft.

Another embodiment under the present disclosure can comprise a method for reducing form drag during takeoff and landing on a tailsitter aircraft. The method includes vertically taking off from the ground in a tailsitter orientation. The method also includes determining a drift angle of the tailsitter aircraft in the tailsitter orientation. The method also includes estimating a magnitude and a direction of the wind using the drift angle of the tailsitter aircraft. The method also includes adjusting a heading of the tailsitter aircraft based on the difference to minimize the drift angle to reduce the form drag on the unmanned tailsitter aircraft.

Another embodiment under the present disclosure can comprise a system for reducing form drag on a tailsitter aircraft during at least one of takeoff or landing. The system comprises a flight control system configured to determine a drift angle of the tailsitter aircraft in the tailsitter orientation. The system also comprises a monitoring system in communication with the flight control system. The monitoring system is configured to estimate a magnitude and a direction of the wind using the drift angle of the tailsitter aircraft and adjust a heading of the tailsitter aircraft based on the difference to minimize the drift angle to reduce the form drag on the tailsitter aircraft.

Another embodiment under the present disclosure can comprise a system for reducing form drag on an aircraft during at least one of takeoff or landing. The aircraft includes a broad side and a narrow side. The system comprises an instrumentation configured to determine wind information. The system also comprises a flight control system configured to receive the wind information from instrumentation. The system also comprises a monitoring system configured to adjust a heading of the rotorcraft based on the magnitude and the direction of the wind until the narrow side of the aircraft faces the wind.

Another embodiment under the present disclosure can comprise a method for reducing form drag during takeoff and landing on a rotorcraft. The rotorcraft includes a broad side and a narrow side. The method includes detecting a magnitude and a direction of the wind by a wind sensor. The method also includes transmitting the magnitude and the direction of the wind to a flight control system of the rotorcraft. The method also includes adjusting a heading of the rotorcraft based on the magnitude and the direction of the wind until the narrow side of the rotorcraft faces the wind.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 6 depicts a flowchart of another exemplary method for turning the narrow side of the aircraft to the wind using the system of FIG. 4;

FIG. 7 depicts a diagrammatic view of a second exemplary system of turning the narrow side of the aircraft to the wind; and FIG. 8 depicts a flowchart of another exemplary method for turning the narrow side of the aircraft to the wind using the system of FIG. 7.

DETAILED DESCRIPTION OF THE INVENTION

I. First Exemplary Rotorcraft

Figure 1A:
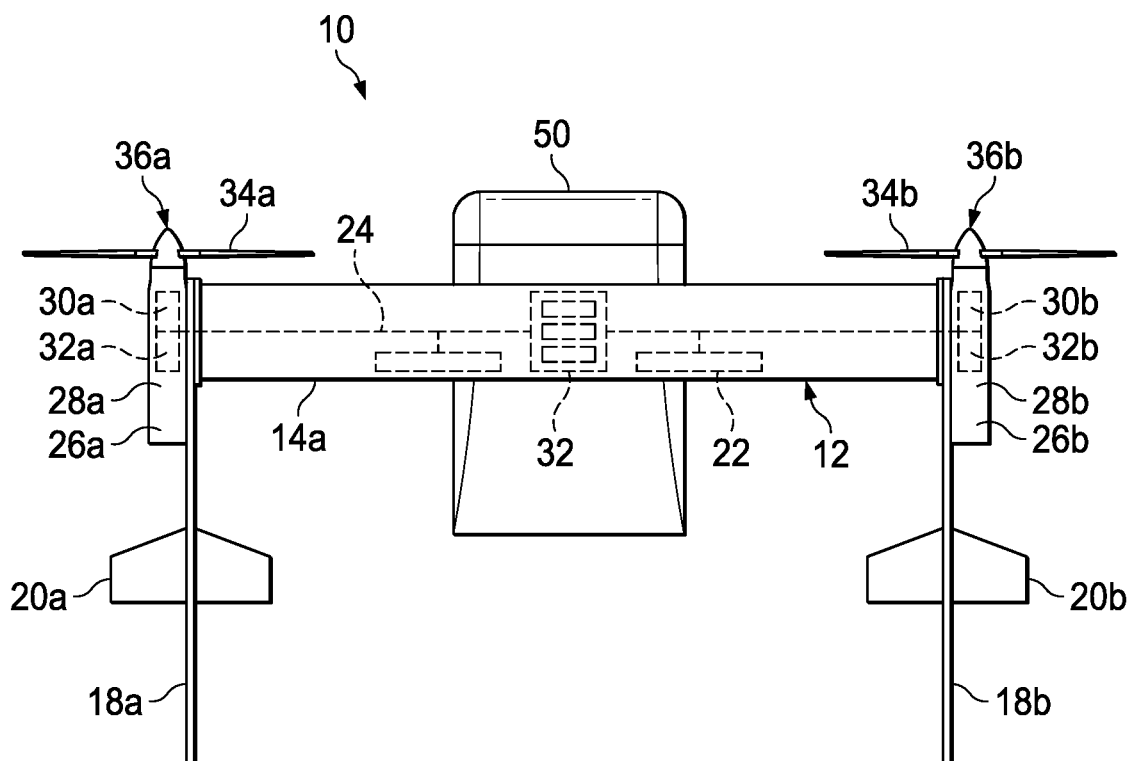
FIG. 1A depicts side elevation view of a broad side of an exemplary aircraft in a tailsitting orientation.
Figure 1B:
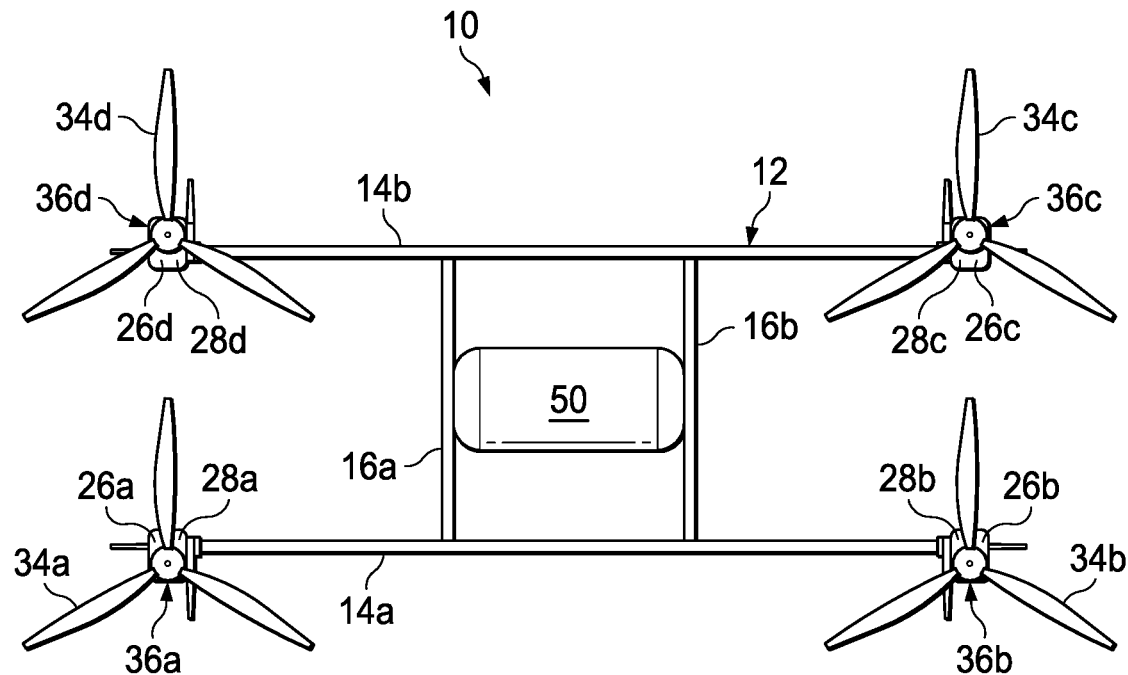
FIG. 1B depicts a front view of the broad side of the aircraft of FIG. 1A in a cruise orientation.
Figure 1C:
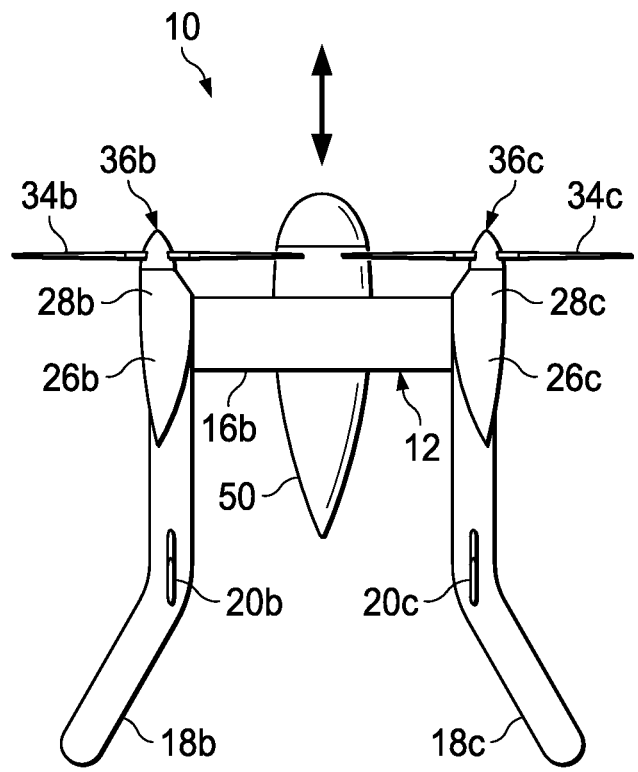
FIG. 1C depicts a side view of a narrow side of the aircraft of FIG. 1A in the tailsitting orientation.
Figure 1D:
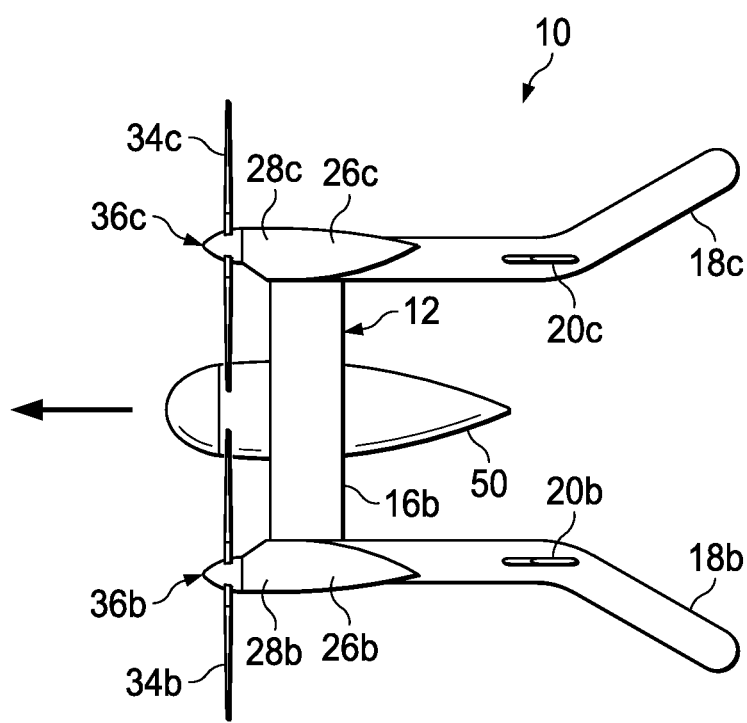
FIG. 1D depicts a side view of the narrow side of the aircraft of FIG. 1A in the cruise orientation.

FIGS. 1A-1D show an aircraft 10 that may be subclass of VTOL aircraft and also a subclass of fixed wing aircraft. FIGS. 1A and 1C depict aircraft 10 in thrust-borne flight which may also be referred to as the vertical takeoff and landing, VTOL flight mode, or a tailsitting orientation. FIGS. 1B and 1D depict aircraft 10 in wing-borne flight which may also be referred to as the forward/high-speed forward flight mode of aircraft 10 or a cruise orientation. Additional details of aircraft 10 are shown and described in U.S. Pub. No. 2020/0231297, entitled "Aircraft having Redundant Directional Control," published on Jul. 23, 2020, the disclosure of which is incorporated by reference herein. Additional details are shown and described in U.S. Pat. No. 10,618,646, entitled "Rotor Assembly Having a Ball Joint for Thrust Vectoring Capabilities," issued on Apr. 14, 2020, the disclosure of which is incorporated by reference herein.

In the illustrated embodiment, the airframe 12 of aircraft 10 includes wings 14a, 14b each having an airfoil cross-section that generates lift responsive to the forward airspeed of aircraft 10. Extending generally perpendicularly between wings 14a, 14b are two truss structures depicted as pylons 16a, 16b. Extending generally perpendicularly from wings 14a, 14b are landing gear depicted as tail members 18a, 18b, 18c, 18d that enable aircraft 10 to operate as a tailsitting aircraft. Tail members 18a, 18b, 18c, 18d each include a control surface 20a, 20b, 20c, 20d, respectively, that may be passive or active aerosurfaces that serve as vertical stabilizers and/or elevators during wing-borne flight and serve to enhance hover stability during thrust-borne flight. Wings 14a, 14b and pylons 16a, 16b may include central passageways operable to contain flight control systems, energy sources, communication lines and other desired systems. For example, as best seen in FIG. 1A, wing 14a houses the flight control system 32 of aircraft 10.

In the illustrated embodiment, wings 14a, 14b and/or pylons 16a, 16b may contain one or more of electrical power sources depicted as batteries 22 in wing 14a, as best seen in FIG. 1A. Batteries 22 supply electrical power to flight control system 32. In some embodiments, batteries 22 may be used to supply electrical power for the distributed thrust array of aircraft 10. Wings 14a, 14b and/or pylons 16a, 16b also contain a communication network 24 that enables flight control system 32 to communicate with the distributed thrust array of aircraft 10.

In the illustrated embodiment, the distributed thrust array includes four propulsion assemblies 26a, 26b, 26c, 26d that are independently operated and controlled by flight control system 32. In the illustrated embodiment, each propulsion assembly 26a, 26b, 26c, 26d includes a housing 28a, 28b, 28c, 28d, that contains components such as an electric motor, a gimbal, one or more actuators and an electronics node including, for example, batteries, controllers, sensors and other desired electronic equipment. Electric motors 30a, 30b and electronics nodes 32a, 32b are visible in FIG. 1A.

Flight control system 32 communicates via communications network 24 with the electronics nodes of each propulsion assembly 26a, 26b, 26c, 26d, such as electronics node 32a of propulsion assembly 26a and electronics node 32b of propulsion assembly 26b. Flight control system 32 receives sensor data from and sends flight command information to the electronics nodes of each propulsion assembly 26a, 26b, 26c, 26d such that each propulsion assembly 26a, 26b, 26c, 26d may be individually and independently controlled and operated. For example, flight control system 32 is operable to individually and independently control the operating speed and thrust vector of each propulsion assembly 26a, 26b, 26c, 26d. Flight control system 32 may autonomously control some or all aspects of flight operation for aircraft 10. Flight control system 32 is also operable to communicate with remote systems, such as a ground station via a wireless communications protocol. The remote system may be operable to receive flight data from and provide commands to flight control system 32 to enable remote flight control over some or all aspects of flight operation for aircraft 10. The autonomous and/or remote operation of aircraft 10 enables aircraft 10 to perform unmanned logistic operations for both military and commercial applications.

Each propulsion assembly 26a, 26b, 26c, 26d includes a rotor assembly 34a, 34b, 34c, 34d. Each rotor assembly 34a, 34b, 34c, 34d is directly or indirectly coupled to an output drive of a respective electrical motor 30a, 30b, 30c, 30d that rotates the rotor assembly 34a, 34b, 34c, 34d in a rotational plane to generate thrust for aircraft 10. Each electrical motor 30a, 30b, 30c, 30d is paired with a rotor assembly 34a, 34b, 34c, 34d, for example electrical motor 30a and rotor assembly 34a, to form a propulsion system 36a, 36b, 36c, 36d. As described herein, each propulsion system 36a, 36b, 36c, 36d may have a single-axis or a two-axis tilting degree of freedom relative to housings 28a, 28b, 28c, 28d and thus airframe 12 such that propulsion systems 36a, 36b, 36c, 36d are operable for thrust vectoring. Aircraft 10 may operate as a transport aircraft for a pod assembly 50 that is fixed to or selectively attachable to and detachable from airframe 12. In the illustrated embodiment, pylons 16a, 16b include receiving assemblies for coupling with pod assembly 50. While not shown, aircraft may alternatively include a turbine engine or ducted fan and be configured to function a similar manner.

Sequential flight-operating scenario of aircraft 10 is shown and described in U.S. Pub. No. 2020/0231297, entitled "Aircraft having Redundant Directional Control," published on Jul. 23, 2020, the disclosure of which is incorporated by reference herein. When aircraft 10 is ready for a mission, flight control system 32 commences operations to provide flight control to aircraft 10 which may be autonomous flight control, remote flight control or a combination thereof. For example, it may be desirable to utilize remote flight control during certain maneuvers such as takeoff and landing but rely on autonomous flight control during hover, high speed forward flight and/or transitions between wing-borne flight and thrust-borne flight.

As shown in FIG. 1C, aircraft 10 may perform a vertical takeoff and be engaged in thrust-borne flight (i.e., tailsitter orientation) with pod assembly 50 lifted into the air. As illustrated, the rotor assemblies 34a, 34b, 34c, 34d are each rotating in the same horizontal plane forming of a two-dimensional distributed thrust array. As noted, flight control system 32 independently controls and operates each propulsion assembly 26a, 26b, 26c, 26d including independently controlling operating speeds and thrust vectors. During hover, flight control system 32 may utilize differential speed control of rotor assemblies 34a, 34b, 34c, 34d for stabilizing aircraft 10 and for providing yaw authority. This may be achieved by increasing the speed of the rotor assemblies rotating clockwise, such as rotor assemblies 34a, 34c and/or decreasing the speed of the rotor assemblies rotating counterclockwise, such as rotor assemblies 34b, 34d. As discussed herein, flight control system 32 is operable to send commands to a symmetrically disposed propulsion assembly to counteract a thrust vector error in the compromised propulsion assembly. Alternatively or in addition to, flight control system 32 is operable to send commands to any one or all of the other propulsion assemblies to counteract a thrust vector error in the compromised propulsion assembly.

After vertical ascent to the desired elevation, aircraft 10 may begin the transition from thrust-borne flight to wing-borne flight (i.e., cruise orientation). Aircraft 10 is operable to pitch forward from thrust-borne flight to wing-borne flight to enable high speed and/or long-range forward flight. Flight control system 32 may achieve this operation by increasing the speed of rotor assemblies 34c, 34d and/or decreasing the speed of rotor assemblies 34a, 34b, collective thrust vectoring of propulsion systems 36a, 36b, 36c, 36d, collective control surface maneuvers of control surfaces 20a, 20b, 20c, 20d or any combination thereof. As wing-borne forward flight requires significantly less power then thrust-borne vertical flight, the operating speed of some or all of propulsion assembly 26a, 26b, 26c, 26d may be reduced. In forward flight mode, the independent control of flight control system 32 over each propulsion assembly 26a, 26b, 26c, 26d provides pitch, roll and yaw authority using, for example, collective or differential thrust vectoring, differential speed control, collective or differential control surface maneuvers or any combination thereof. In addition, as in thrust-borne vertical flight, when aircraft 10 is engaged in wing-borne forward flight, flight control system 32 is operable to send commands to a symmetrically disposed propulsion assembly or multiple other propulsion assemblies to counteract an error in one of the propulsion assemblies.

As aircraft 10 approaches its destination, aircraft 10 may begin its transition from wing-borne flight to thrust-borne flight. Aircraft 10 is operable to pitch aft from wing-borne flight to thrust-borne flight to enable, for example, a vertical landing operation. Flight control system 32 may achieve this operation by increasing the speed of rotor assemblies 34a, 34b and/or decreasing the speed of rotor assemblies 34c, 34d, collective thrust vectoring of propulsion systems 36a, 36b, 36c, 36d, collective control surface maneuvers of control surfaces 20a, 20b, 20c, 20d or any combination thereof. Once aircraft 10 has completed the transition to thrust-borne vertical flight, aircraft 10 may commence its vertical descent to a surface. As seen in FIG. 1C, aircraft 10 hovers and lands in the tailsitting orientation at the destination location and may, for example, remotely drop a payload carried within pod assembly 50.

II. Turning Narrow Side into the Wind to Minimize Form Drag

Aircraft 10 may be a manned or an unmanned vehicle. Aircraft 10 includes a broad side (see FIGS. 1A-1B) and a narrow side (see FIGS. 1C-1D). Aircraft 10 may "barn door" when hovering broad side to the wind, which requires more power to maintain the desired position. When the broad side (i.e. the long side) faces the wind, aircraft 10 leans into the wind which may make aircraft 10 more prone to rollover, as the broad side is a less stable axis than narrow side. When aircraft 10 rotates the narrow side into the wind, aircraft 10 uses less power to maintain position, and aircraft 10 is more stable at touch down and naturally settles to the ground. As a result, it may be desirable for aircrafts (such as aircraft 10) to turn into the wind. In other words, it may be desirable for the narrow axis to take most of wind (turn heading to wind). One such example of an aircraft turning into the wind is shown and described in U.S. Pat. No. 7,617,024, entitled, "Automatic Heading Control System for Tiltrotor Aircraft and Helicopters," issued on Nov. 10, 2009, the disclosure of which is incorporated by reference herein.

Generally, there are two general types of drag: parasitic drag and induced drag. Induced drag is produced as part of lift (airfoil, propeller/rotor blades) and parasitic drag generally includes is the other drag that does not produce lift for aircraft. Form drag is a subset of parasitic drag that is created by the form or structure of the aircraft. It is beneficial to reduce the form drag (and thus overarching parasitic drag) produced as a result of relative wind. As used herein, relative wind is the direction of movement of the atmosphere relative to an aircraft or an airfoil and the planform of the aircraft.

Relative wind may be calculated using various methods. For a fixed wing aircraft, correcting for wind drift may be performed by using roll or crab (yaw), or a combination of the two. Relative wind may be corrected for using one, the other, or both. Alternatively, relative wind may be determined by ascertaining a drift vector, which is the same as the relative wind. The aircraft's compass heading and true air speed (TAS) may be represented as a heading vector. The wind direction and speed as a relative wind vector. The sum of the heading vector and the wind vector represent the aircraft's actual track and speed over the ground. The difference between the heading vector and the ground vector is the drift angle caused by the wind. In other words, the difference between the heading and true air speed versus the track and ground speed is known as the drift angle. The difference in the heading vector of the aircraft and the tracking vector of the aircraft is the drift vector/relative wind. There is a drift angle associated with this, also known as a drift angle.

A. Exemplary Operating Environment

In some versions of an operating environment 110, aircraft 10 and a ground-based system 112 may send and receive communications between one another directly. Alternatively, in other versions of operating environment 110, aircraft 10 and ground-based system 112 may communicate with each other through a network 124. Network 124 may include one or more private or public networks (e.g., the Internet) that enable the exchange of data.

Figure 3:
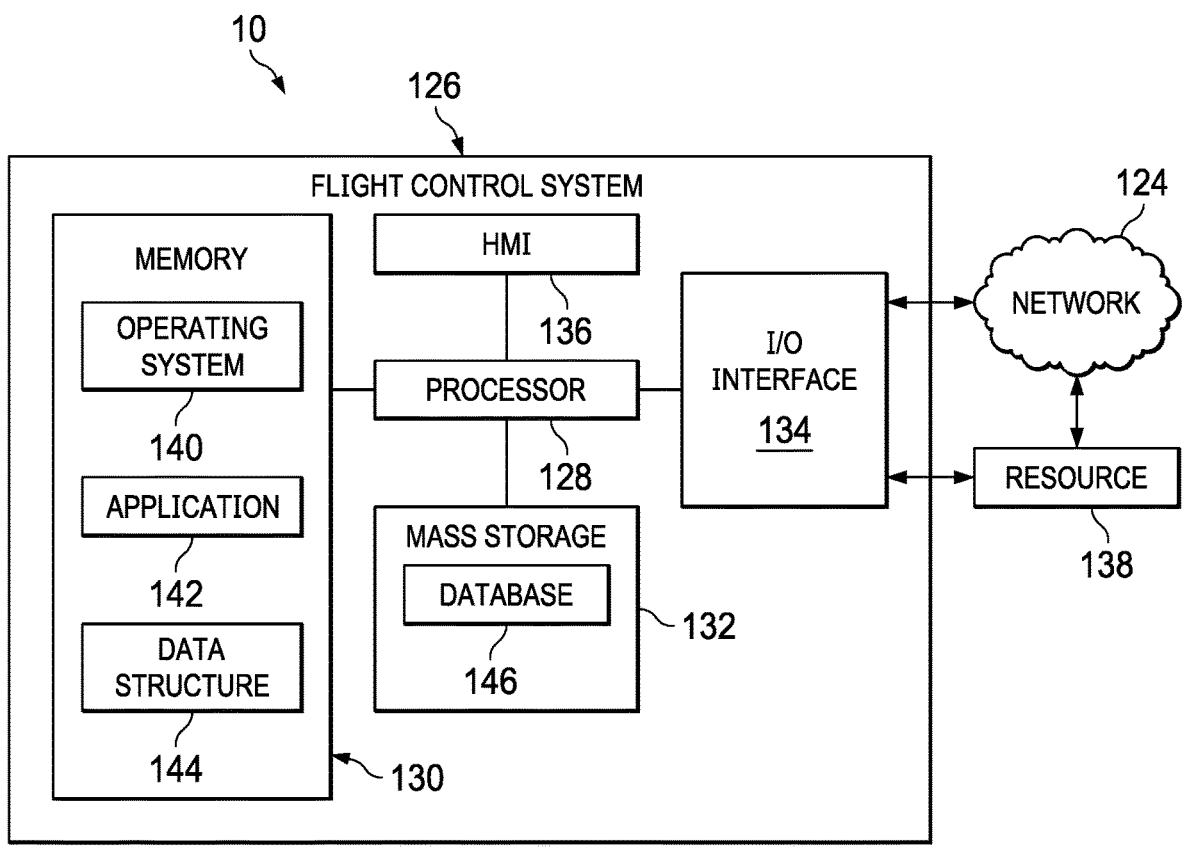
FIG. 3 depicts a diagrammatic view of an exemplary flight control system of the system of FIG. 2.

Referring now to FIG. 3, aircraft 10, ground-based system 112, and network 124 of operating environment 110 may be implemented on one or more computing devices or systems, such as an exemplary computer system, shown as flight control system 126. Flight control system 126 may include a processor 128, a memory 130, a mass storage memory device 132, an input/output I/O interface 134, and a Human Machine Interface HMI 136. Flight control system 126 may also be operatively coupled to one or more external resources 138 via network 124 or I/O interface 134. External resources may include, but are not limited to, servers, databases, mass storage devices, peripheral devices, cloud-based network services, or any other suitable computer resource that may be used by flight control system 126.

Processor 128 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals analog or digital based on operational instructions that are stored in memory 130. Memory 130 may include a single memory device or a plurality of memory devices including, but not limited, to read-only memory ROM, random access memory RAM, volatile memory, non-volatile memory, static random access memory SRAM, dynamic random access memory DRAM, flash memory, cache memory, or any other device capable of storing information. Mass storage memory device 132 may include data storage devices such as a hard drive, optical drive, tape drive, non-volatile solid-state device, or any other device capable of storing information.

Processor 128 may operate under the control of an operating system 140 that resides in memory 130. Operating system 140 may manage computer resources so that computer program code embodied as one or more computer software applications, such as an application 142 residing in memory 130, may have instructions executed by processor 128. In an alternative embodiment, processor 128 may execute the application 142 directly, in which case operating system 140 may be omitted. One or more data structures 144 may also reside in memory 130, and may be used by processor 128, operating system 140, or application 142 to store or manipulate data.

I/O interface 134 may provide a machine interface that operatively couples processor 128 to other devices and systems, such as network 124 or external resource 138. Application 142 may thereby work cooperatively with network 124 or external resource 138 by communicating via I/O interface 134 to provide the various features, functions, applications, processes, or modules comprising embodiments of the invention. Application 142 may also have program code that is executed by one or more external resources 138, or otherwise rely on functions or signals provided by other system or network components external to flight control system 126. Indeed, given the nearly endless hardware and software configurations possible, persons having ordinary skill in the art will understand that embodiments of the invention may include applications that are located externally to computer system 126, distributed among multiple computers or other external resources 138, or provided by computing resources hardware and software that are provided as a service over network 124, such as a cloud computing service.

HMI 136 may be operatively coupled to processor 128 of computer system 126 in a known manner to allow a user to interact directly with computer system 126. HMI 136 may include video or alphanumeric displays, a touch screen, a speaker, and any other suitable audio and visual indicators capable of providing data to the user. HMI 136 may also include input devices and controls such as an alphanumeric keyboard, a pointing device, keypads, pushbuttons, control knobs, microphones, etc., capable of accepting commands or input from the user and transmitting the entered input to processor 128.

A database 146 may reside on mass storage memory device 132, and may be used to collect and organize data used by the various systems and modules described herein. Database 146 may include data and supporting data structures that store and organize the data. In particular, database 146 may be arranged with any database organization or structure including, but not limited to, a relational database, a hierarchical database, a network database, or combinations thereof. A database management system in the form of a computer software application executing as instructions on processor 128 may be used to access the information or data stored in records of database 146 in response to a query, where a query may be dynamically determined and executed by operating system 140, other applications 142, or one or more modules.

B. Exemplary System and Method to Turn Aircraft into the Wind

Turn into wind system 210 includes a flight control system 212, which may include at least similar features to flight control system 32 described above. Flight control system 212 uses feedback from one or more systems to turn aircraft 10 into the wind. It is envisioned that turn into wind system 510 and method 610 may be used with turn into wind system 210 and methods 310, 410. Flight control system 212 may be considered a vehicle state estimator. Flight control system 212 may determine current state heading, position, and/or location of aircraft 10.

Figure 2:
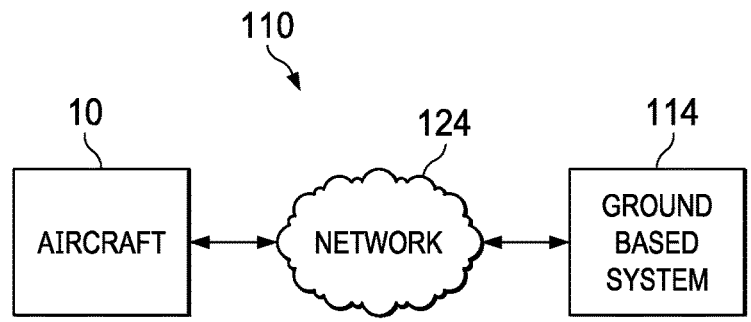
FIG. 2 depicts a diagrammatic view of an exemplary system.
Figure 4:
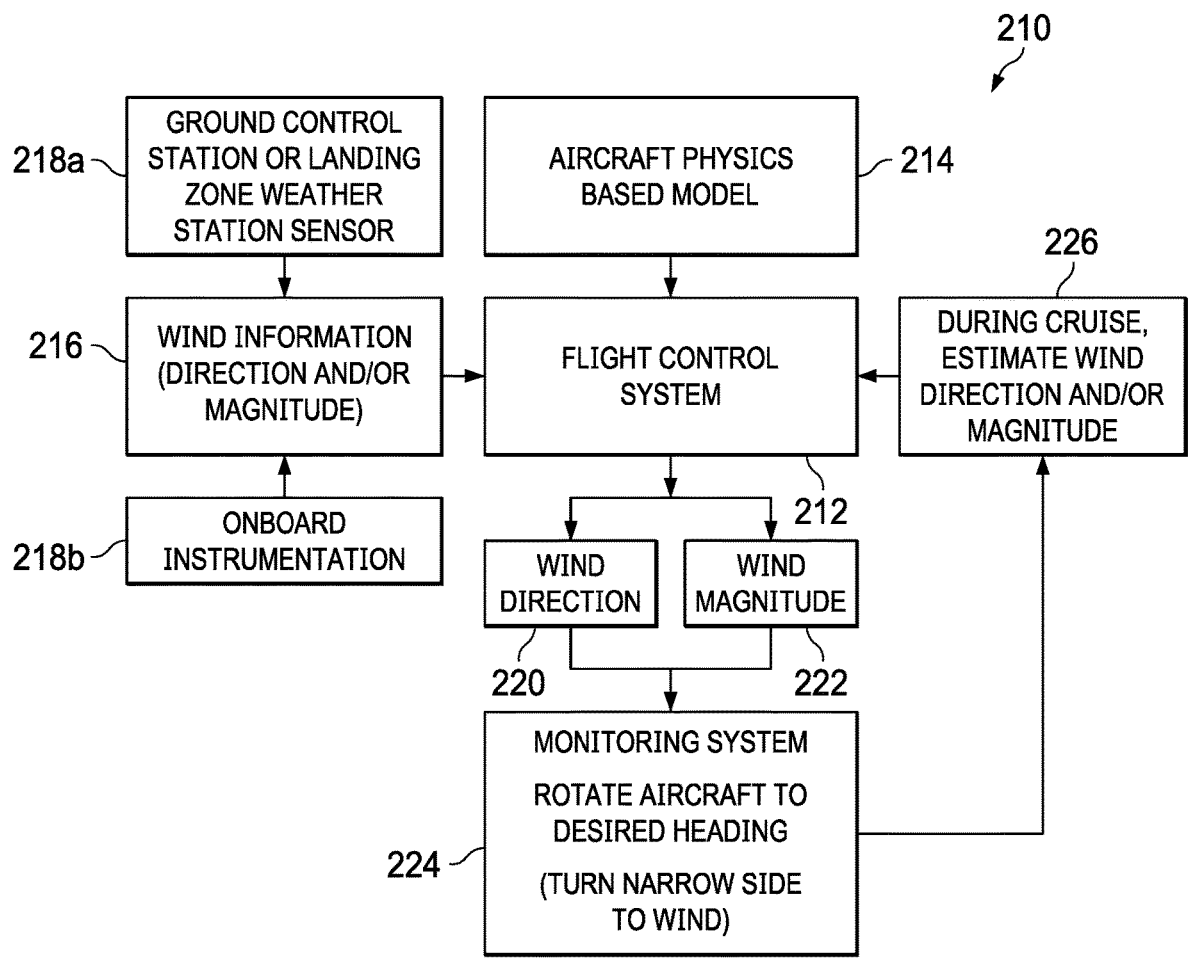
FIG. 4 depicts a diagrammatic view of a first exemplary system of turning the narrow side of the aircraft to the wind.

As shown in FIG. 4, flight control system 212 obtains input data from an aircraft physics-based model 214, which is a mathematical model of aircraft 10. For example, aircraft physics-based model 214 may include coefficients of lift and parameters of flight that are based off of the mathematical model, such that the rotation angle may be estimated. In some versions, flight control system 212 obtains wind information 216 from sensor outputs of instrumentation (e.g., at least one of sensor 218a or onboard instrumentation 218b). Wind information 218 may include at least one of wind direction or wind magnitude. In some versions, offboard wind information from ground-based system 114 (see FIG. 2) may be transmitted to aircraft 10 to help orient aircraft 10. For example, this wind information 216 may be transmitted from a ground control station of landing zone weather station sensor 218a located at or near a landing zone. For example, this wind information 216 may be transmitted over network 124. In some versions, wind information 218 may be transmitted from onboard aircraft 10 using onboard instrumentation (located on aircraft 10). An aircraft data system (e.g., flight control system 212) may determine the present relative wind by comparing the True Air Speed (TAS) and aircraft heading (so the heading vector) both available from aircraft instruments, with the tracking vector determined by the onboard navigation computer, which calculates this based on change in location over time as determined by GPS and/or INS inputs. For example, this wind information 216 may be transmitted using one or more wires or wirelessly. Wind information 218 obtained from onboard instrumentation 218b disposed on aircraft 10 may be transmitted to flight control system 212 of aircraft 10. In some versions, onboard instrumentation 218b may comprise one or more MEMS sensors.

Flight control system 212 then determines at least one of wind direction 220 or wind magnitude 222 using aircraft physics-based model 214 and wind information 216 from at least one of sensor 218a or onboard instrumentation 218b.

For example, the output of wind sensor 218a may be used to determine the adjustment to the heading of aircraft 10 while landing at or near the landing zone. Flight control system 212 sends a signal to propulsion assemblies 26a, 26b, 26c, 26d to rotate aircraft 10 until the desired heading is obtained. Similar to flight control system 32, flight control system 212, may independently operate and control propulsion assemblies 26a, 26b, 26c, 26d described above.

System 210 may autonomously estimate wind direction and orient the nose of aircraft 10 towards the wind allowing aircraft 10 to perform in high wind conditions. For example, high wind conditions may include cross-winds above a predetermined velocity. This rotation of aircraft 10 into the wind is beneficial at any time aircraft 10 is in the air. This period includes before landing to ensure aircraft 10 descends parallel to the ground to reduce the likelihood of a rollover. Additionally, it may be beneficial to apply system 210 to the departure of aircraft 10, which may be at least partially determined by a predetermined flight plan.

Figure 5:
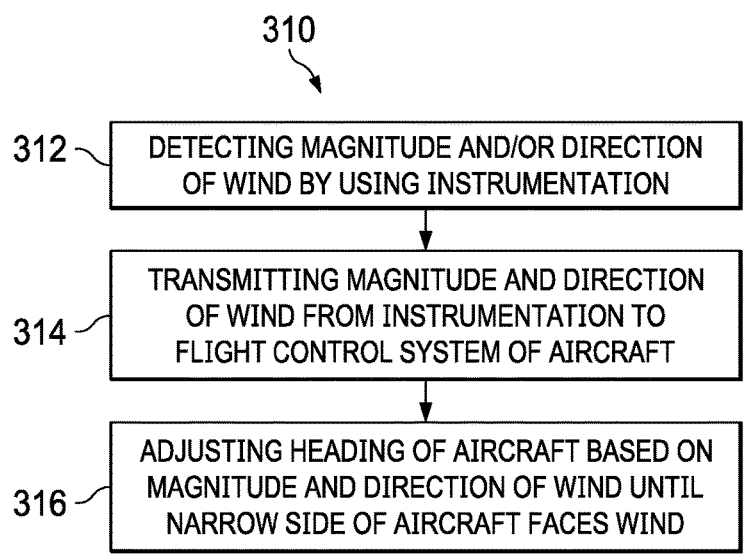
FIG. 5 depicts a flowchart of an exemplary method for turning the narrow side of the aircraft to the wind using the system of FIG. 4.

A method 310 for reducing form drag during at least one of takeoff or landing on a rotorcraft (e.g., aircraft 10) is now described with reference to FIGS. 4-5. It is envisioned that turn into wind system 210 and method 310 may be used with method 410 and/or turn into wind system 510 and method 610. At step 312, method 310 includes detecting a magnitude and/or a direction of the wind by at least one of sensor 218a or onboard instrumentation 218b. At step 314, method 310 includes transmitting wind information 216 representative of the at least one of a magnitude of the wind or a direction of the wind from at least one of sensor 218a or onboard instrumentation 218b to flight control system 212 of aircraft 10.

At step 316, method 310 includes adjusting a heading of aircraft 10 based on wind information 216 until the narrow side of aircraft 10 faces the wind. In some versions, method 310 may include comparing wind information 216 to a predetermined maximum for wind information 216. If the wind information 216 is greater than the predetermined maximum, manual heading control may be disabled, and the heading of aircraft 10 may be adjusted with respect to the wind, so as to decrease the form drag on aircraft 10. If the absolute value is less than the predetermined maximum, manual control of aircraft 10 may be enabled.

Another method 410 for reducing form drag on a tailsitter aircraft (e.g., aircraft 10) during at least one of takeoff or landing is now described with reference to FIGS. 4 and 6. It is envisioned that turn into wind system 210 and method 410 may be used with method 310 and/or turn into wind system 510 and method 610. At step 412, method 410 includes vertically taking off from the ground in a tailsitter orientation (see FIGS. 1A and 1C).

Method 410 may also include determining a drift angle of aircraft 10 in the tailsitter orientation. Measuring the drift angle may include measuring a heading angle of tailsitter aircraft while in the cruise orientation. The heading angle may be compared to the ground track angle. At least one of a current airspeed or a current ground track speed may be determined by flight control system 212 based on the comparison.

At step 414, method 410 includes calculating at least one of a magnitude of the wind or a direction of the wind using the drift angle of the tailsitter aircraft. This calculation may be based on the orientation of aircraft 10. Flight control system 212 may measure/detect an effect of the wind on the tailsitter aircraft without directly measuring the wind (using a sensor). While in the cruise orientation, flight control system 212 may determine a drift angle of aircraft 10 and calculate at least one of a magnitude of the wind or a direction of the wind using the drift angle of aircraft 10. This calculation may be based on the orientation of aircraft 10. The drift angle may be transmitted back to flight control system 212.

At step 416, method 410 includes automatically adjusting a heading of aircraft 10 based on the difference to minimize the drift angle to reduce the form drag on aircraft 10. The heading of aircraft 10 may be automatically adjusted based on the calculation so that the narrow side of aircraft 10 faces the wind. This updating of the drift angle may occur multiple times and may in some instances be continuous performed and/or automatically performed. Method 400 monitors control input to estimate the wind direction and/or wind magnitude while flying in the cruise orientation. For example, when approaching the landing zone, method 410 may determine the drift angle to input the landing estimation to estimate the wind information. In cruise orientation when aircraft 10 flies on the wing, aircraft 10 may monitor side slip and control inputs to estimate wind direction and magnitude prior to entering into a hover and landing.

C. Exemplary System and Method to Using Pitch to Turn into Wind

Turn into wind system 510 includes a flight control system 512. Flight control system 512 may include similar features to flight control system 32, 212 described above. As previously described, aircraft 10 includes a broad side (see FIGS. 1A-1B) and a narrow side (see FIGS. 1C-1D). Aircraft 10 may be a manned or unmanned vehicle. It is envisioned that turn into wind system 510 and method 610 may be used with turn into wind system 210 and methods 310, 410 described above. While system 510 is shown as including flight control system 512 and monitoring system 514, it is envisioned that flight control system 512 and monitoring system 514 may be included in a single flight control system.

As shown, monitoring system 514 determines actual pitch 516 of aircraft 10. Monitoring system 514 also stores a predetermined pitch (e.g., a predetermined maximum allowable pitch 518). Monitoring system 514 compares actual pitch 516 to predetermined pitch (e.g., a predetermined maximum allowable pitch 518). For example, monitoring system 520 may calculate a difference between actual pitch and maximum allowable pitch 518 to determine a magnitude of a rotation rate command 522. This rotation rate command 522 may be input into flight control system 512 for analysis.

A method 610 for reducing form drag during at least one of takeoff or landing on tailsitter aircraft (shown as aircraft 10) is now described with reference to FIGS. 7-8. At step 612, method 610 includes vertically taking off from the ground in a tailsitter orientation. Method 610 may include rotating at least fuselage (e.g., pod assembly 50) of aircraft 10 to a cruise orientation of FIGS. 1B and 1D from the tailsitter orientation of FIGS. 1A and 1C. For example, aircraft 10 in its entirety may be rotated 90 degrees to the cruise orientation, where the fuselage may be generally parallel with the horizon.

At step 614, method 610 includes determining an actual pitch of aircraft 10 in the tailsitter orientation. In some versions, this determination is performed at a time between a landing commitment point and landing of aircraft 10 on the ground. Pitch heading may refer to angle nose up/down, roll heading may refer to the angle left/right wing up/down, and yaw heading may refer to the yaw angle. Pitch may be minimized by turning (i.e., rotating) aircraft 10 to reduce the aircraft structural planform facing into the relative wind to minimize form drag. In other words, this rotation reduces the pitch by reducing the planform of aircraft 10. In so doing, this may increase the roll into the relative wind. However, the roll is less than the pitch in the other orientation because of the difference of planform facing the relative wind. In a different VTOL configuration, for a rotorcraft, tiltrotor, rotor wing, it may be desirable to limit a different control input or aircraft orientation. For example, in a helicopter, it may be desirable to minimizing the roll/pitch by considering desired limits of the pitch of the cyclic blade control, rather than pitch of aircraft 10 itself.

At step 616, method 610 includes determining a difference between actual pitch and a maximum allowable pitch. In some versions, maximum allowable pitch 518 may be about 5 degrees or less, with a target of about 0 degrees. Current actual pitch 516 versus maximum allowable pitch 518 prevents aircraft 10 from pitching over to correct for barn dooring.

At step 618, method 610 includes adjusting a heading of aircraft 10 based on the difference to minimize the pitch angle to reduce the form drag on aircraft 10. Automatically adjusting the heading of aircraft 10 based on the difference allows for narrow side of aircraft 10 to face the wind. It may be desirable to minimize the pitch angle. By measuring the tilt (pitch angle), wind direction and/or wind magnitude may be determined. The heading of aircraft 10 may be altered to correct for the pitch angle (to prevent aircraft 10 from pitching over).

Aircraft 10 may monitor control inputs and resulting pitch during hover to turn aircraft 10 so that aircraft 10 is oriented relative to the wind. Method 610 uses the form drag on aircraft 10 in order to measure the wind direction and/or wind magnitude. This may be beneficial while aircraft 10 is in hover mode. For example, turning aircraft 10 into the wind is beneficial when aircraft 10 is at a point in time between the landing commitment point and landing (i.e., contact of aircraft 10 to the ground). Landing commitment point is the point is time where the decision to land is final and irreversible.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for reducing form drag on a tailsitter aircraft during at least one of takeoff or landing, the method comprising:
   (a) supporting the tailsitter aircraft by a tail member of the tailsitter aircraft contacting the ground while in a tailsitter orientation;
   (b) vertically taking off from the ground in the tailsitter orientation;
   (c) determining an actual pitch of the tailsitter aircraft in the tailsitter orientation;
   (d) determining a difference between the actual pitch and a predetermined pitch;
   (e) adjusting a heading of the tailsitter aircraft based on the difference to minimize a pitch angle to reduce form drag on the tailsitter aircraft.

2. The method of claim 1, wherein the tailsitter aircraft includes a broad side and a narrow side, wherein automatically adjusting further comprises adjusting the heading of the tailsitter aircraft based on the difference so that the narrow side of the tailsitter aircraft faces the wind.

3. The method of claim 1, wherein the predetermined pitch defines a maximum allowable pitch, wherein the maximum allowable pitch is about 5 degrees or less.

4. The method of claim 1, wherein the determining the difference step and the adjusting step are performed at a time between a landing commitment point and landing of the tailsitter aircraft on the ground.

5. The method of claim 1, further comprising rotating at least a fuselage of the tailsitter aircraft to a cruise orientation from the tailsitter orientation.

6. The method of claim 5, wherein rotating at least the fuselage further comprises rotating the entire tailsitter aircraft about 90 degrees to the cruise orientation.

7. The method of claim 5, the method further comprising while in the cruise orientation:
   (a) measuring a heading angle of the tailsitter aircraft;
   (b) comparing the heading angle to a ground track angle; and
   (c) determining at least one of a current airspeed or a current ground track speed based on the comparison.

8. The method of claim 5, the method further comprising while in the cruise orientation:
   (a) determining a drift angle of the tailsitter aircraft; and
   (b) calculating at least one of a magnitude of the wind or a direction of the wind using the drift angle of the tailsitter aircraft.

9. The method of claim 8, wherein the calculating step further comprises based on orientation of the tailsitter aircraft, calculating an effect of the wind on the tailsitter aircraft without directly measuring the wind.

10. The method of claim 1, wherein the adjusting step is performed automatically.

11. The method of claim 1, wherein the tailsitter aircraft includes a broad side and a narrow side, the method further comprising:
    (a) transmitting wind information representative of the at least one of a magnitude of the wind or a direction of the wind from a ground based wind sensor or onboard instrumentation to a flight control system of the tailsitter aircraft; and
    (b) automatically adjusting the heading of the tailsitter aircraft based on the wind information until the narrow side of the tailsitter aircraft faces the wind.

12. The method of claim 11, inputting information from a physics-based model to the flight control system.

13. A system for reducing form drag on a tailsitter aircraft during at least one of takeoff or landing, the system comprising:
    (a) a flight control system configured to determine a drift angle of the tailsitter aircraft in the tailsitter orientation; and
    (b) a monitoring system in communication with the flight control system, wherein the monitoring system is configured to:

(i) estimate a magnitude and a direction of the wind using the drift angle of the tailsitter aircraft, wherein the drift angle is based on a difference between a heading and true air speed versus a track and ground speed of the tailsitter aircraft, and (ii) adjust a heading of the tailsitter aircraft based on the difference to minimize the drift angle to reduce the form drag on the tailsitter aircraft.

14. The system of claim 13, wherein the monitoring system is configured to calculate, based on orientation of the tailsitter aircraft, the form drag on the tailsitter aircraft without directly measuring the wind.

15. The system of claim 14, wherein the tailsitter aircraft includes a broad side and a narrow side, wherein the monitoring system is configured to automatically adjust the heading of the tailsitter aircraft based on the estimation so that the narrow side of the tailsitter aircraft faces the wind.

16. A system for reducing form drag on an aircraft during at least one of takeoff or landing, wherein the aircraft includes a broad side and a narrow side, the system comprising:

(a) an instrumentation configured to determine wind information;

(b) a flight control system configured to receive the wind information from the instrumentation; and (c) a monitoring system configured to adjust a heading of the aircraft based on a magnitude and a direction of the wind until the narrow side of the aircraft faces the wind.

17. The system of claim 16, wherein the flight control system is configured to:

(a) compare the wind information to a predetermined maximum of the wind information; and (b) if the wind information is greater than the predetermined maximum:

(i) disable manual heading control of the aircraft, and (ii) adjust the heading of the aircraft with respect to the wind so as to decrease the form drag on the aircraft.

18. The system of claim 16, wherein the instrumentation comprises a wind sensor located near a landing zone.

19. The system of claim 18, wherein transmitting wind information further comprises transmitting the wind information from the wind sensor located at a landing zone using a wireless network to determine the adjustment to heading of the aircraft while landing at the landing zone.

20. The system of claim 16, wherein the wind information includes wind direction and wind magnitude.

* * * * *